(12) United States Patent
Berman et al.

(10) Patent No.: US 12,092,573 B2
(45) Date of Patent: Sep. 17, 2024

(54) METHODS AND SYSTEMS FOR OPEN PATH GAS DETECTION

(71) Applicant: Insight M Inc., Sunnyvale, CA (US)

(72) Inventors: Elena S F Berman, Mountain View, CA (US); Scott Buchter, Espoo (FI); Harshil Kamdar, Cambridge, MA (US); Erin Wetherley, Oakland, CA (US); Michael Matthews, Portola Valley, CA (US)

(73) Assignee: INSIGHT M INC., Sunnyvale, CA (US)

( * ) Notice: Subject to any disclaimer, the term of this patent is extended or adjusted under 35 U.S.C. 154(b) by 0 days.

(21) Appl. No.: 18/231,094

(22) Filed: Aug. 7, 2023

(65) Prior Publication Data

US 2024/0210315 A1    Jun. 27, 2024

Related U.S. Application Data

(60) Provisional application No. 63/406,304, filed on Sep. 14, 2022.

(51) Int. Cl.
G01N 21/39 (2006.01)

(52) U.S. Cl.
CPC ....... *G01N 21/39* (2013.01); *G01N 2021/394* (2013.01); *G01N 2021/399* (2013.01)

(58) Field of Classification Search
CPC ............. G01N 21/39; G01N 2021/394; G01N 2021/399
USPC .......................................................... 356/437
See application file for complete search history.

(56) References Cited

U.S. PATENT DOCUMENTS

| | | | |
|---|---|---|---|
| 5,991,032 A * | 11/1999 | Atkinson | G01N 21/39 250/343 |
| 2008/0198027 A1 * | 8/2008 | Bugge | G08B 17/103 340/632 |
| 2010/0163733 A1 | 7/2010 | Prasad et al. | |
| 2017/0356842 A1 | 12/2017 | Rao et al. | |
| 2018/0248332 A1 | 8/2018 | Dinovitser | |
| 2022/0390361 A1 * | 12/2022 | Ai | G01S 17/95 |

* cited by examiner

*Primary Examiner* — Tri T Ton
(74) *Attorney, Agent, or Firm* — Foley & Lardner LLP

(57) ABSTRACT

A system for detecting a gas may include a first laser having a wavelength overlapping with two or more absorption features in a spectrum of the gas, a second laser having a wavelength centered away from absorbing features in the spectrum of the gas, and at least one sensor to determine a received power of the first laser and a received power of the second laser.

16 Claims, 8 Drawing Sheets

METHODS AND SYSTEMS FOR OPEN PATH GAS DETECTION

CROSS-REFERENCE TO RELATED APPLICATIONS

This application claims priority to U.S. Provisional Patent Application No. 63/406,304 filed on Sep. 14, 2022, the entirety of which is incorporated by reference herein.

TECHNICAL FIELD

The embodiments described herein relate to open path gas detection and/or quantification.

BACKGROUND

There are primarily two existing families of methods of open path gas detection and quantification using laser illumination. Both utilize laser sources with substantially narrower linewidth than individual gas absorption features.

The first family of methods relies on scanning the frequency of a tunable laser source to map out the absorption of one or more gas absorption lines. There are broadly two different ways to measure gas concentrations in this method: tunable diode laser absorption spectroscopy (TDLAS) and wavelength modulation spectroscopy (WMS).

The second family of methods, differential absorption LiDAR (DIAL), relies on measuring the returned laser power at two different set wavelengths: an absorption line (the "on" wavelength) and a nearby spectral region of no absorption (the "off" wavelength). The difference between the transmitted and received powers of the two beams allows for the calculation of the path integrated absorption of light.

Given the urgent need to reliably measure greenhouse gas emissions on large spatial scales, both DIAL and WMS/TDLAS-based instruments have recently been deployed on UAV-based, ground-based, and airborne platforms. Laser-based approaches generally provide greater sensitivity as well as more flexible operations than other options, such as methods that rely on reflected sunlight illumination, since they are less sensitive to weather considerations.

However, both of these families of systems require an expensive and complex laser source or amplifier to achieve a signal-to-noise ratio that is adequate for remote sensing measurements. Moreover, center wavelength and linewidth stability of these systems is extremely challenging due to thermal and mechanical variability when performing airborne measurements. Aging characteristics such as avoidance of nondeterministic mode hops of the laser can increase maintenance time.

SUMMARY

A novel method is disclosed for the open path sensing of gas molecules. The embodiments described herein allow for the utilization of much simpler, open loop laser sources than conventional systems. A method is disclosed to choose spectral regions with dense spectral absorption lines where such an application would be possible. By choosing a dense region and illuminating the region with a laser that has linewidth that encompasses two or more absorption lines, a laser that is not actively wavelength stabilized can be used since the absorption signal is far less sensitive to the laser's center wavelength than conventional approaches. This laser without active wavelength stabilization is less expensive, requires fewer optical and electronics components, and is more stable in the presence of thermal and mechanical changes.

BRIEF DESCRIPTION OF THE DRAWINGS

The accompanying drawings constitute a part of this specification and illustrate embodiments of the subject matter disclosed herein.

DETAILED DESCRIPTION

Figure 1:
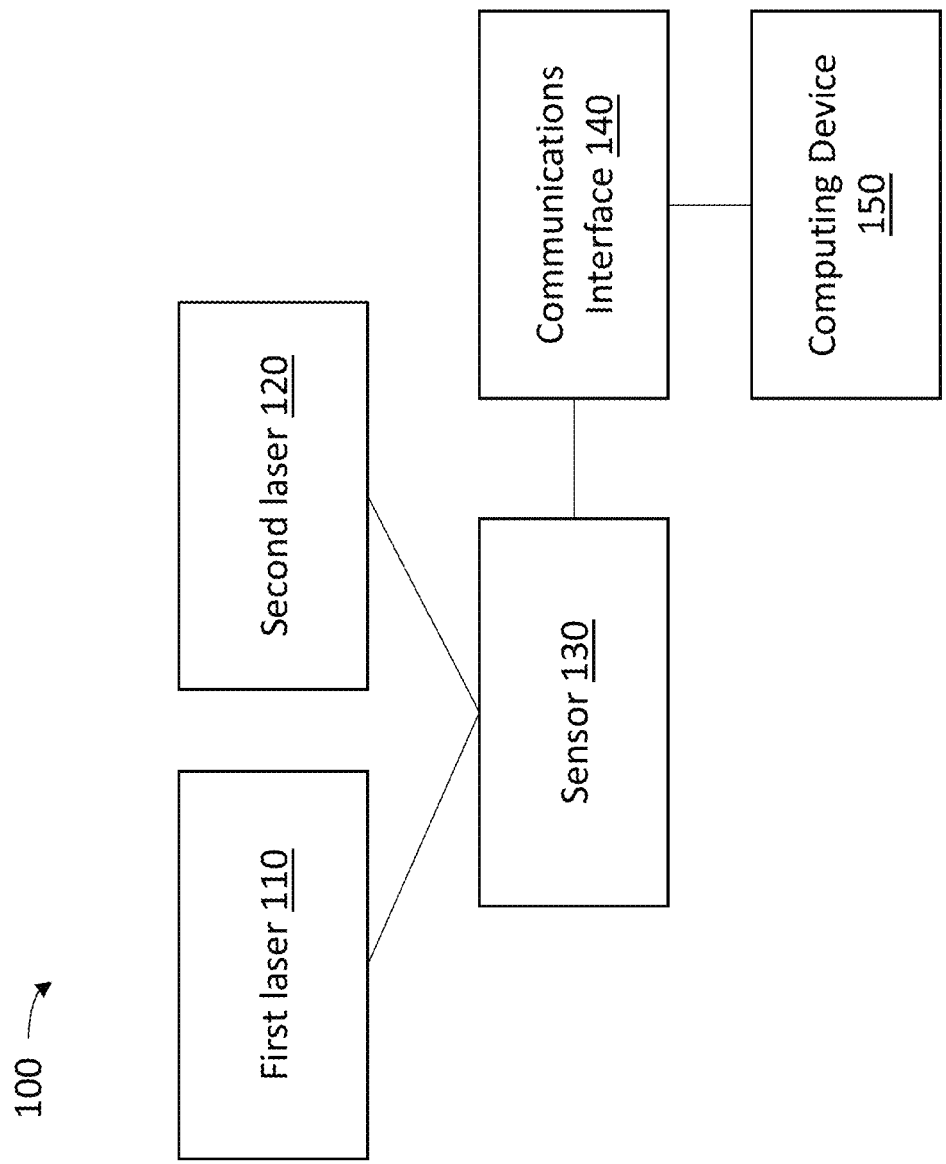
FIG. 1 is a block diagram illustrating a system using two lasers for detecting a gas.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The embodiments described herein provide a method and system which gives the benefits of prior laser-based approaches with a much simpler laser source and system. In the absorption spectrum of a variety of gas molecules there are regions of closely spaced absorption lines. In TDLAS and WMS-based approaches, these regions have largely been avoided for measurements as it is difficult to accurately fit the resulting measured returns due to the complexity of the absorption spectra. In DIAL-based approaches, these regions have largely been avoided for measurement as it is difficult to accurately provide "on" and "off" wavelengths due to the closely spaced nature of the lines. In addition, the absorption may not drop to zero in between these lines making it difficult to make an accurate measurement. An "on" wavelength is a laser wavelength which is on an absorption line. An "off" wavelength is a laser wavelength which is not on an absorption line.

Example embodiments utilize a portion of a region of closely spaced absorption features for the "on" wavelength and a region nearby for the "off" wavelength. By comparing absorption of the "on" region to absorption of the "off" region, or to expected absorption estimated from previous measurements or the scientific literature, information about the path-integrated absorption of the gas being studied may be determined.

FIG. 1 is a block diagram illustrating a system 100 using two lasers for detecting a gas. The system 100 includes a first laser 110, a second laser 120, a sensor 130, a communications interface 140, and a computing device 150. The system 100 may be used for gas detection and/or quantification. The system 100 may be used to detect and/or quantify any gas having a cluster of absorption features in its absorption spectrum. The first laser 110 and the second laser 120 may be directed at an area to detect a gas in the area based on absorption and/or transmission of the first laser 110 and the second laser 120.

The first laser 110 and the second laser 120 may have full width at half maximum (FWHM) linewidths of 0.1-5 nanometers (nm). In some examples, the first laser 110 may have a different linewidth than the second laser 120. In some examples, the first laser 110 may have the same linewidth as the second laser 120. The linewidths of the first laser 110 may depend upon the width of the cluster of absorption features of the gas spectrum. The first laser 110 may have a first wavelength overlapping with two or more absorption features and the second laser 120 may have a second wavelength centered on a portion of the absorption spectrum of the gas having lower absorption than the cluster of absorption features or approximately zero absorption. The linewidth of the first laser 110 may depend upon the width of the closely spaced absorption features and the linewidth of the second laser 120 may be unconstrained by the width of the closely spaced absorption features. The linewidth of the first laser 110 may be greater than or equal to a separation of distinct spectral absorption features of the closely spaced absorption features. The linewidth of the first laser 110 may overlap with or cover more than one distinct spectral absorption feature of the closely spaced absorption features. In some examples, the first laser 110 and the second laser 120 have the same linewidth to facilitate comparison of absorption of the first laser 110 and the second laser 120.

The wavelength of the first laser 110 may be an "on" wavelength, as it is centered on the two or more absorption features, and the wavelength of the second laser 120 may be an "off" wavelength, as it is centered off of absorption features. The first laser and the second laser may also be chosen to be close together in wavelengths. This helps minimize any potential ambiguity that may arise due to variations in the spectral reflectivity of the target area between the "on" wavelength and "off" wavelengths, which could erroneously appear like excess or sparse absorption.

The sensor 130 may include one sensor or a plurality of sensors. The sensor may determine or detect a received power of the first laser 110 and a received power of the second laser 120. In some examples, the sensor 130 may include a first sensor for determining the received power of the first laser 110 and a second sensor for determining the received power of the second laser 120. In some examples, the sensor 130 may include an additional sensor for determining the transmitted power of the first laser 110 and the transmitted power of the second laser 120. In some examples, the additional sensor may include two separate sensors for determining the transmitted power of the first laser 110 and the second laser 120, respectively. The received power of the first laser 110 is less than the transmitted power of the first laser 110, as a portion of the transmitted power of the first laser 110 is absorbed by the gas. Similarly, the received power of the second laser 120 is less than the transmitted power of the second laser 120, as a portion of the transmitted power of the second laser 120 is absorbed by the gas. However, a first difference between the transmitted power of the first laser 110 and the received power of the first laser 110 may be greater than a second difference between the transmitted power of the second laser 120 and the received power of the second laser 120, as the second laser 120 has a wavelength centered on a portion of little to no absorption and high transmission of the spectrum of the gas. Both the first laser 110 and the second laser 120 may suffer additional loss between the transmitted and received power due to other absorption or geometric loss from the optical arrangement, but these losses will be common to both lasers.

The communications interface 140 may transmit the received power and/or a digital representation of the received power of the first laser 110 and the received power and/or a digital representation of the received power of the second laser 120 to the computing device 150. The communications interface 140 may receive the received power of the first laser 110 and the received power of the second laser 120 from the sensor 130. The communications interface 140 may receive the transmitted power of the first laser 110 and the second laser 120 from the sensor 130. In some examples, the communications interface 140 may transmit the transmitted power of the first laser 110 and the second laser 120 to the computing device 150. In some examples, the communications interface 140 transmits only the received power of the first laser 110 and the received power of the second laser 120 to the computing device 150.

The computing device 150 may include one or more processors and a memory including instructions which, when executed by the processor, cause the processor to perform functions described herein. The memory may include a non-transitory, computer-readable medium including the instructions. The computing device 150 may calculate an amount of the gas by comparing the first difference between the transmitted power of the first laser 110 and the received power of the first laser 110 and the second difference between the transmitted power of the second laser 120 and the received power of the second laser 120. The computing device 150 may use techniques associated with conventional DIAL approaches to compare the first difference to the second difference to derive an accurate path-integrated concentration of the gas and reduce noise.

In some examples, the computing device 150 receives digital data from the sensor corresponding to the data collected by the sensor 130. The sensor 130 collects the transmitted power of the first laser 110, the received power of the first laser 110, the transmitted power of the second laser 120, and the received power of the second laser 120, and the computing device determines the first difference and the second difference. In some examples, the computing device 150 receives, from the sensor 130, the first difference and the second difference. In some examples, the computing device 150 receives only the received power of the first laser 110 and the received power of the second laser 120 from the sensor 130 and uses a known transmitted power of the first laser 110 and a known transmitted power of the second laser 120 to determine the first difference and the second difference.

In some examples, the first laser 110, the second laser 120, the sensor 130, and the communications interface 140 are part of or mounted on manned aircraft or unmanned aerial vehicles (UAV), such as a light aircraft or drone, or satellites. In some examples, the computing device 150 may be separate from the aircraft or UAV or satellite and may receive information from the communications interface 140. In some examples, the computing device 150 may be part of or mounted on the aircraft or UAV or satellite and may receive information directly from the sensor 130 and/or first and second lasers 110, 120. The communications interface 140 may transmit the gas concentration determined by the computing device 150 to an additional computing device. In some examples, the first laser 110, the second laser 120, the sensor 130, and the communications interface 140 are mounted on a tower or a ground-based platform.

The first laser 110 and the second laser in the system 100 may not be actively wavelength stabilized ("open loop") since the absorption signal is far less sensitive to the laser's center wavelength than conventional approaches. This laser without active wavelength stabilization is less expensive, requires fewer optical and electronics components, and is more robust in the presence of thermal and mechanical changes compared to other laser sources.

Advantageously, the first laser 110 and/or the second laser 120 have a broad linewidth. Open-loop laser sources can have much higher average power than the laser sources generally used for TDLAS, WMS, and conventional DIAL. The broad linewidth allows for open path gas detection and/or quantification at longer distances and/or higher sensitivities. The system 100 requires much less stringent center wavelength and linewidth stability than current methods, allowing for simpler, more robust systems for open path gas detection. For example, the need to "lock" a laser center wavelength to a particular absorption feature, as with conventional DIAL, is eliminated, allowing the elimination of the entire feedback system to accomplish "locking".

The system 100 moreover does not require a laser source to smoothly "scan" over a range of wavelengths as is required for TDLAS and WMS. The reduction in the stringency of the center wavelength and linewidth stability requirements makes the system 100 more amenable to harsh remote sensing environments such as airborne or satellite deployments. While the advantages will be most pronounced for open-path gas detection/quantification, the system 100 could also be used in a closed gas cell.

The system 100 may also include conventional noise-reducing capabilities inherent to other techniques such as frequency, phase and/or amplitude modulation of the open loop laser sources. In these instruments, signal processing methods can be used to improve signal-to-noise, such as analog or digital modulation/demodulation, lock-in detection, or autocorrelation of waveforms. These filtering methods are possible because the waveform used to modulate the transmitted laser is known a-priori and can be correlated with the received signal thereby reducing the effect of noise due to solar photons or thermal noise generated in the detector.

Many kinds of laser sources would be appropriate for the methods disclosed herein. As opposed to DIAL and WMS-based methods which require careful wavelength and linewidth calibration and monitoring, laser sources for the system 100 require little to no calibration once built. In addition, although methane is used as an example herein, the disclosed methods are suitable for any gas (for e.g., carbon dioxide) which has the desired absorption spectrum properties.

In some implementations, the system 100 does not include the second laser 120. The system 100 may detect and/or quantify the amount of the gas using the received power of the first laser 110. The computing device 150 may compare the received power of the first laser 110 to other data, such as known spectral parameters for the gas of interest, atmospheric data, temperature, distance to the target, data from past or future time periods, measured absorption using a known reference, and/or data from additional sensors. In an example, the received power of the first laser 110 is compared to known spectral parameters of the gas of interest under the sensing conditions. The amount of gas is determined based on comparing the expected received power based on the known spectral parameters to the measured received power of the first laser 110. This configuration is desirable when the received laser power is line-of-sight to the transmitter, or when the received laser power has scattered from a well-calibrated object because only a single laser is required and only a change in the absorption must be detected to estimate the absorption caused by the column density of a gas. In this example the laser may incorporate a stand-alone feedback loop to enable constant power mode in order to counteract drifts of the laser output power. Examples of a well calibrated target are a retro-reflector or a material with reflectivity which is well characterized at the laser wavelength. An example of a line-of-sight system is similar to a free space communication system in which a transmitting laser is aligned to a receiver in a direct path.

In some examples, the system 100 may detect and/or quantify the amount of the gas using only the received power of the first laser 110, where the first laser 110 has a linewidth wide enough to overlap with the cluster of absorption features as well as an adjacent region of lower absorption. The received power of the first laser 110 may be split based on wavelength. The received power of the first laser 110 may be split based on wavelength using a grating or prism, using two sensors of different sensitivities, using two different filters, and other methods. The received power of the first laser 110 may be split into a first portion overlapping with the two or more absorption features and a second portion overlapping with the adjacent region. By comparing the first portion to the second portion and/or their relative absorption, the system 100 can detect and/or quantify the amount of the gas.

In some implementations, the system 100 includes one or more additional lasers having wavelengths centered away from the absorption features. The computing device 150 can determine a third difference between a transmitted power and a received power of the third laser and determine the amount of gas based on the first difference, the second difference, and the third difference. In an example, the computing device 150 takes an average of the second difference and the third difference and compares the average to the first difference to determine the amount of the gas.

Figure 2:
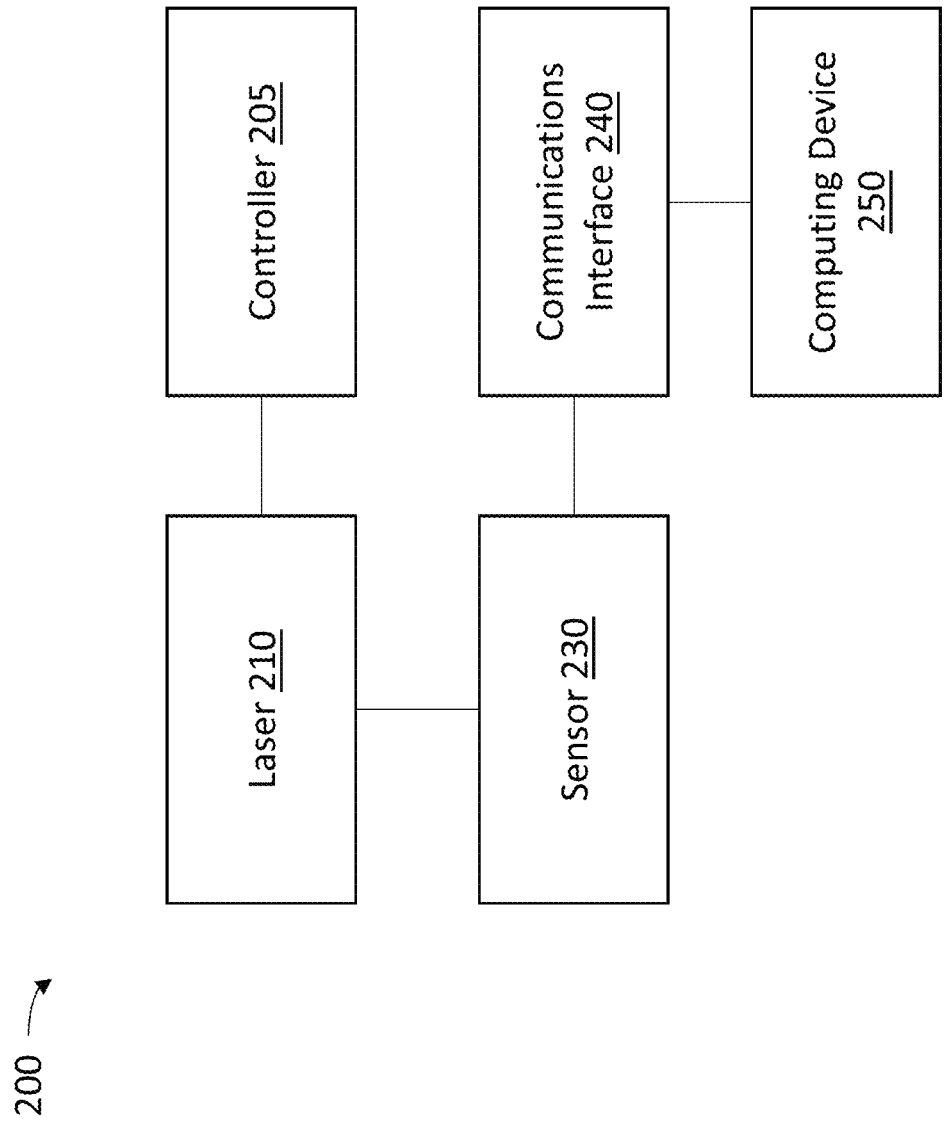
FIG. 2 is a block diagram illustrating a system using a wavelength-modulated laser for detecting a gas.

FIG. 2 is a block diagram illustrating a system 200 using a wavelength-modulated laser 210 for detecting a gas. The system 200 may include the laser 210, a controller 205, a sensor 230, a communications interface 240, and a computing device 250. The system 200 may be similar to the system 100 of FIG. 1, with the exception that the system 200 uses a single modulated laser 210 instead of two lasers. The controller 205 may modulate the wavelength of the laser 210 between an "on" wavelength overlapping two or more closely spaced absorption features of the gas and an "off" wavelength not overlapping absorption features. The "on" wavelength may be the same wavelength as the first laser 110 of FIG. 1 and the "off" wavelength may be the same wavelength as the second laser 120 of FIG. 1. The system 200 may function similar to the system 100 of FIG. 1, and discussion and characteristics of the components of FIG. 1 apply equally to the discussion and characteristics of FIG. 2, with the exception that the laser 210 of FIG. 2 is a single wavelength modulated laser.

Figure 3:
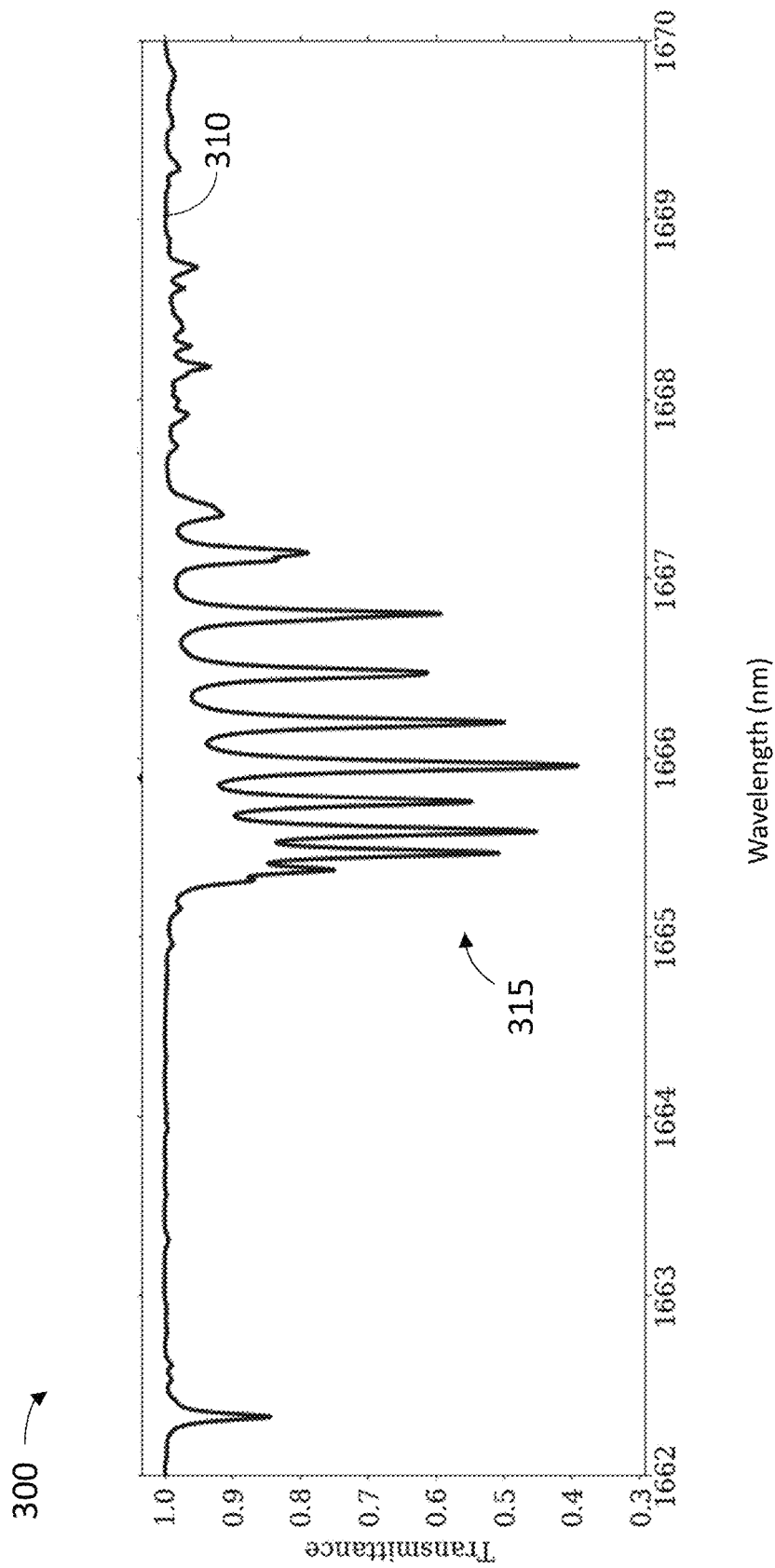
FIG. 3 is a spectrum graph illustrating a portion of a transmittance spectrum for methane gas.

FIG. 3 is a spectrum graph 300 illustrating a portion of a transmittance spectrum 310 for methane gas. The transmittance spectrum 310 may show the transmittance of various wavelengths of light through methane gas. A portion of light traveling through the methane gas is absorbed, and the remainder of the light is transmitted. Thus, the absorption spectrum of methane complements the transmittance spectrum 310. Various wavelengths of light may be absorbed more than others. Wavelengths that are absorbed more than others may correspond to peaks on the absorption spectrum and troughs on the transmittance spectrum 310. The transmittance spectrum 310 may include closely spaced absorption features 315. The closely spaced absorption features 315 may include a cluster of features or lines on the transmittance spectrum 310. The closely spaced absorption features 315 may include a cluster of troughs on the transmittance spectrum 315 corresponding to a cluster of peaks on the absorption spectrum.

Figure 4:
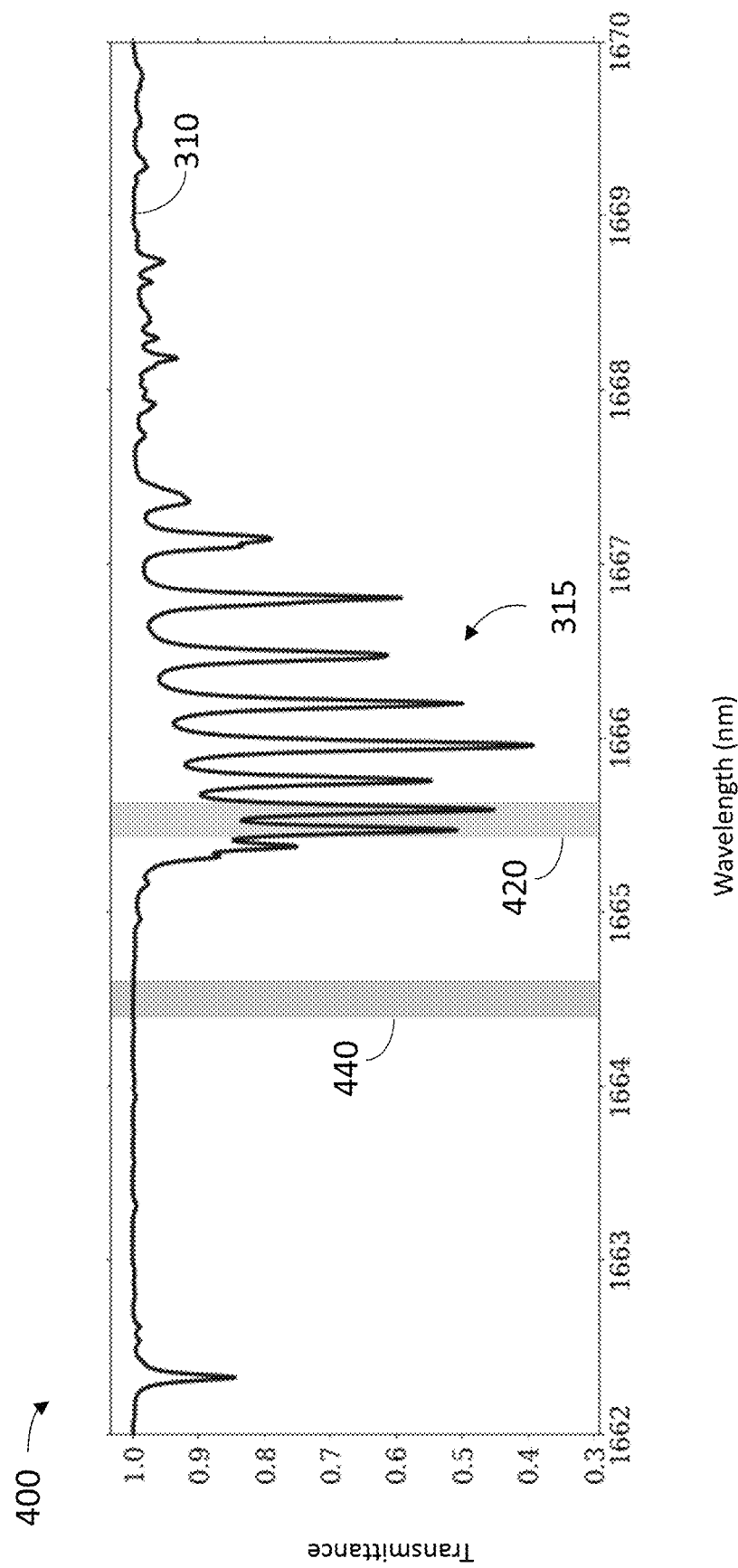
FIG. 4 is a spectrum graph illustrating "on" and "off" wavelengths for a laser having a linewidth of 0.2 nm on the transmittance spectrum for methane gas.

FIG. 4 is a spectrum graph 400 illustrating an "on" wavelength 420 and an "off" wavelength 440 for a laser having a linewidth of 0.2 nm on the transmittance spectrum 310 of FIG. 3 for methane gas. The "on" wavelength 420 may be centered on the two or more closely spaced absorption features 315. The "on" wavelength 420 may cover a portion or an entirety of the closely spaced absorption features 315. The "off" wavelength 440 may be centered away from the closely spaced absorption features 315. The "off" wavelength 440 may be centered on a portion of the transmittance spectrum 310 having approximately full transmittance, or approximately zero absorption. Comparison of the transmittance or absorption at the "on" wavelength 420 and the "off" wavelength 440 can be used to detect and/or quantify methane gas, as discussed herein. In an example, the "on" wavelength 420 is the wavelength of the first laser 110 of FIG. 1 and the "off" wavelength 440 is the wavelength of the second laser 120 of FIG. 1. In another example, the laser 210 of FIG. 2 is modulated between the "on" wavelength 420 and the "off" wavelength 440.

Figure 5:
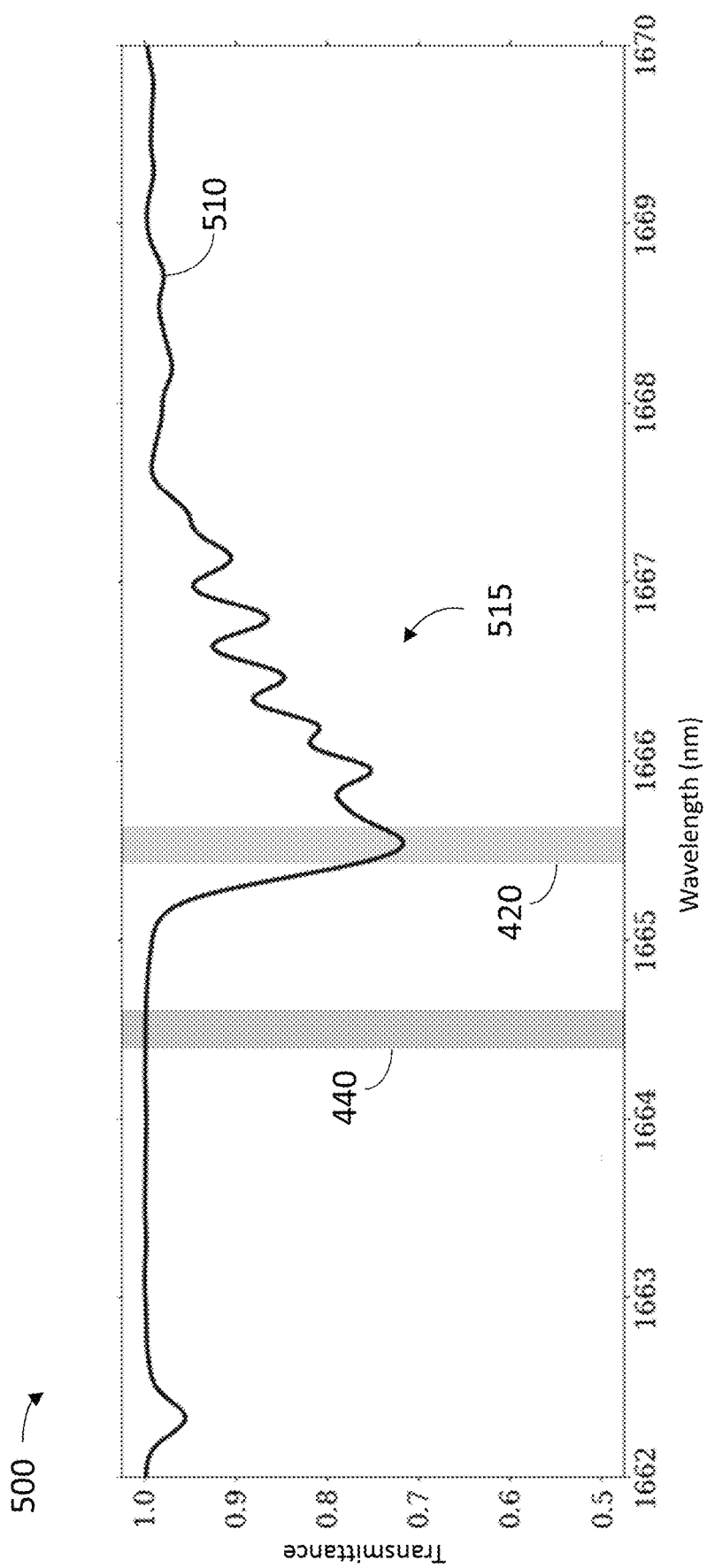
FIG. 5 is a spectrum graph showing a transmittance spectrum of methane gas using an effective resolution of the linewidth used in FIG. 4 and showing the "on" wavelength and "off" wavelength of FIG. 4.

FIG. 5 is a spectrum graph 500 showing a transmittance spectrum 510 of methane gas using an effective resolution of the linewidth used in FIG. 4 and showing the "on" wavelength 420 and "off" wavelength 440 of FIG. 4. The transmittance spectrum 510 may be the transmittance spectrum of methane as recorded using a spectrometer having a linewidth of 0.2 nm. Thus, the effective resolution of the transmittance spectrum 510 is lower than that of the transmittance spectrum 310. The transmittance spectrum 510 may include closely spaced absorption features 515. The closely spaced absorption features 515 may correspond to the closely spaced absorption features 315 of FIG. 3, but with a lower resolution, such that the individual lines and troughs are not visible. The "on" wavelength 420 may be centered on two or more of the closely spaced absorption features 515. In an example, the "on" wavelength 420 may be centered on a portion of the closely spaced absorption features 515 having a lowest transmittance. In an example, the "on" wavelength 420 may be centered on a portion of the closely spaced absorption features 515 having a lowest transmittance at the effective resolution of the transmittance spectrum 510. The "on" wavelength 420 may correspond to a combination of transmissions for multiple features or lines.

Use of the "on" wavelength 420 having a linewidth corresponding to features of two or more of the closely spaced absorption features 515 instead of individual lines provides greater tolerance to shifts in the wavelength of a laser. For example, a laser having a wavelength centered on the "on" wavelength 420 and having a linewidth of 0.2 nm may fluctuate in its wavelength by 0.1 nm and still be nearly centered on the closely spaced absorption features 515. In contrast, a laser having a linewidth of 0.01 nm and having a wavelength centered on one of the individual lines of the transmittance spectrum 310 cannot fluctuate in its wavelength by 0.1 nm without losing the individual line.

Figure 6:
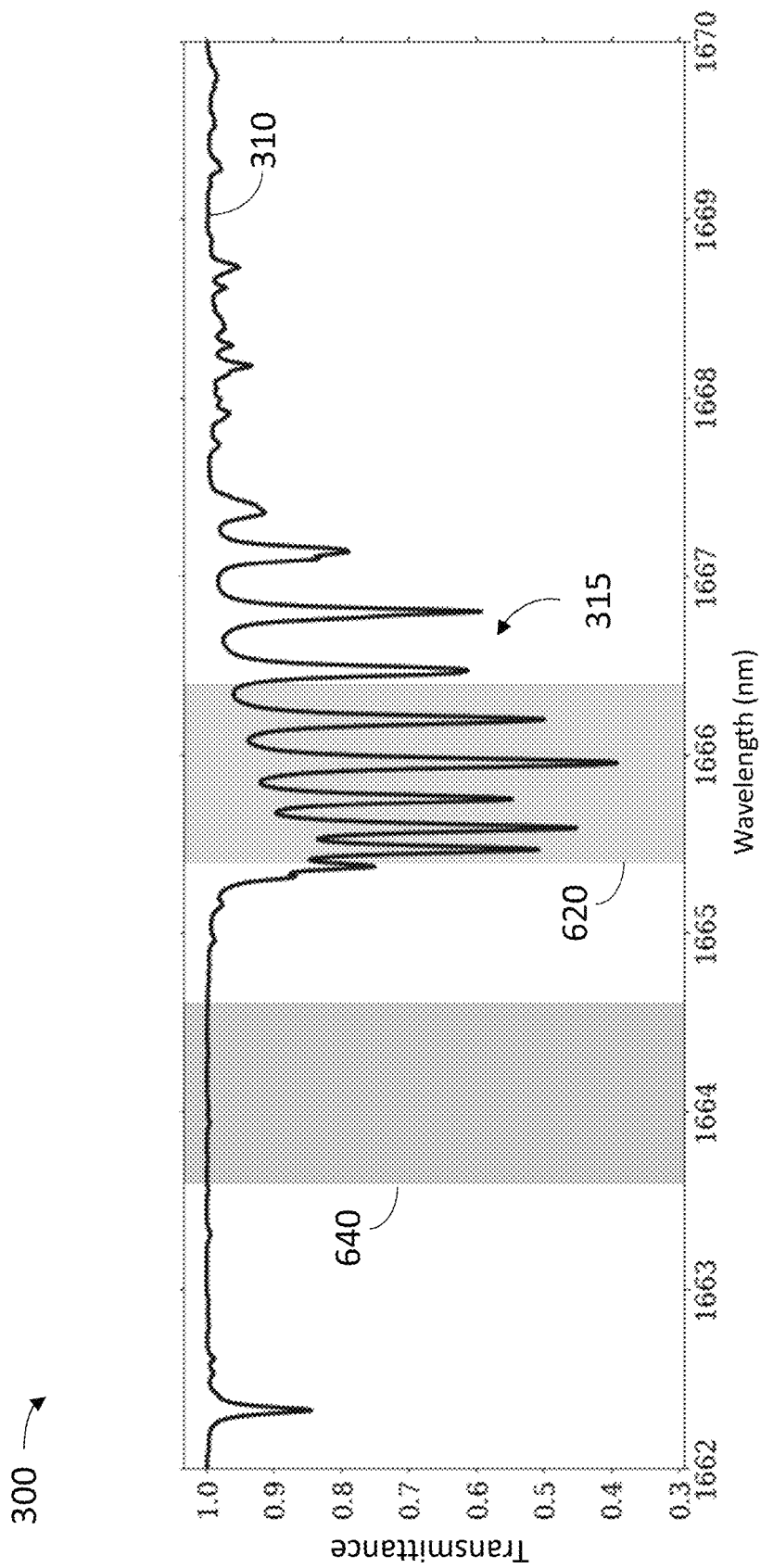
FIG. 6 is a spectrum graph illustrating "on" and "off" wavelengths for a laser having a linewidth of 1 nm on the transmittance spectrum for methane gas.

FIG. 6 is a spectrum graph 600 illustrating an "on" wavelength 620 and an "off" wavelength 640 for a laser having a linewidth of 1.0 nm on the transmittance spectrum 310 of FIG. 3 for methane gas. The "on" wavelength 620 may be centered on two or more of the closely spaced absorption features 315. The "on" wavelength 620 may cover a portion or an entirety of the closely spaced absorption features 315. The "off" wavelength 640 may be centered away from the closely spaced absorption features 315. The "off" wavelength 640 may be centered on a portion of the transmittance spectrum 310 having approximately full transmittance, or approximately zero absorption. Comparison of the transmittance or absorption at the "on" wavelength 620 and the "off" wavelength 640 can be used to detect and/or quantify methane gas, as discussed herein. In an example, the "on" wavelength 620 is the wavelength of the first laser 110 of FIG. 1 and the "off" wavelength 640 is the wavelength of the second laser 120 of FIG. 1. In another example, the laser 210 of FIG. 2 is modulated between the "on" wavelength 620 and the "off" wavelength 640.

Figure 7:
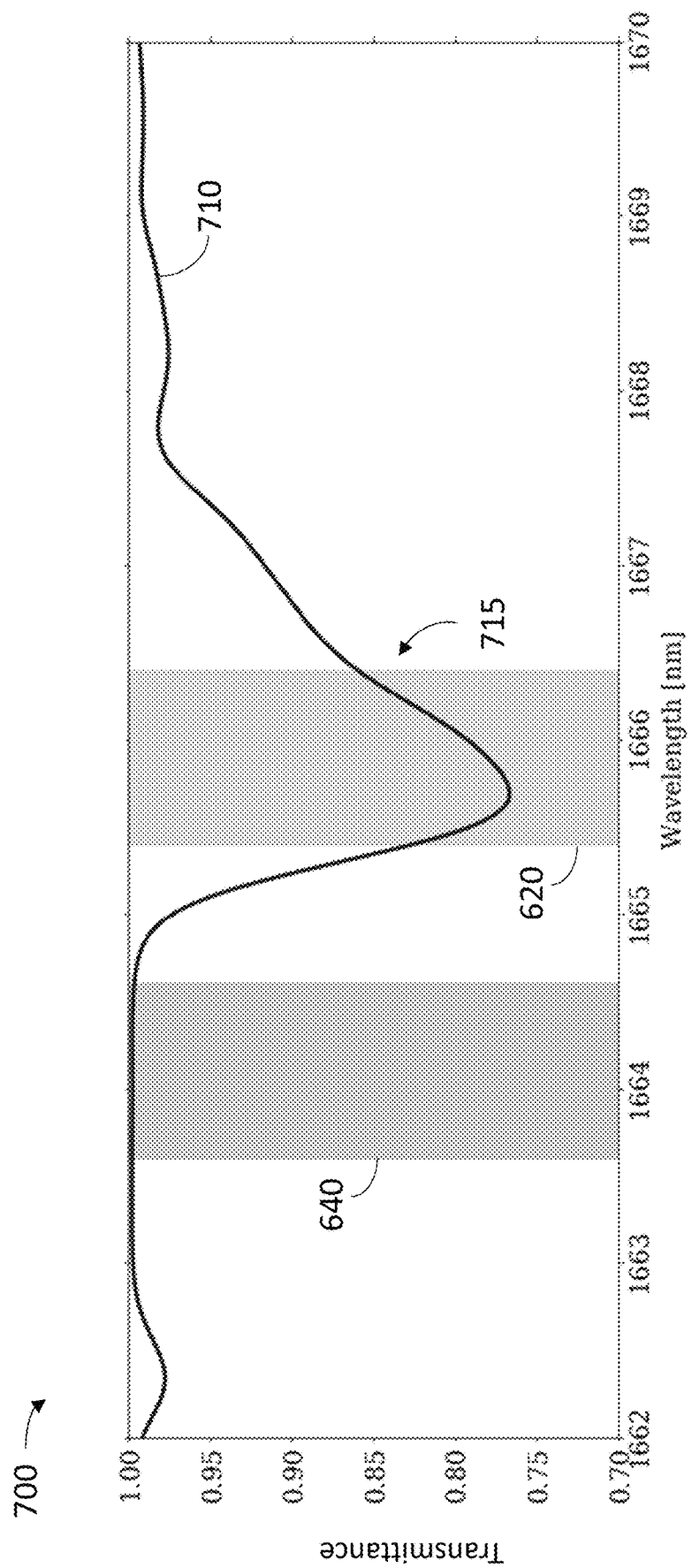
FIG. 7 is a spectrum graph showing a transmittance spectrum of methane gas using an effective resolution of the linewidth used in FIG. 6 and showing the "on" wavelength and "off" wavelength of FIG. 6.

FIG. 7 is a spectrum graph 700 showing a transmittance spectrum 710 of methane gas using an effective resolution of the linewidth used in FIG. 6 and showing the "on" wavelength 620 and "off" wavelength 640 of FIG. 6. The transmittance spectrum 710 may be the transmittance spectrum of methane as recorded using a spectrometer having a linewidth of 1.0 nm. Thus, the effective resolution of the transmittance spectrum 710 is lower than that of the transmittance spectrum 310. The transmittance spectrum 710 may include closely spaced absorption features 715. The closely spaced absorption features 715 may correspond to the closely spaced absorption features 315 of FIG. 3, but with a lower resolution, such that the individual lines and troughs are not visible. The "on" wavelength 620 may be centered on two or more of the closely spaced absorption features 715. In an example, the "on" wavelength 620 may be centered on a portion of the closely spaced absorption features 715 having a lowest transmittance. In an example, the "on" wavelength 620 may be centered on a portion of the closely spaced absorption features 715 having a lowest transmittance at the effective resolution of the transmittance spectrum 710. The "on" wavelength 620 may correspond to a combination of transmissions for multiple features or lines.

Use of the "on" wavelength 620 having a linewidth corresponding to features of the closely spaced absorption features 715 instead of individual lines provides greater tolerance to shifts in the wavelength of a laser. For example, a laser having a wavelength centered on the "on" wavelength 620 and having a linewidth of 1 nm may fluctuate in its wavelength by 0.2 nm and still be nearly centered on the closely spaced absorption features 715. In contrast, a laser having a linewidth of 0.01 nm and having a wavelength centered on one of the individual lines of the transmittance spectrum 310 cannot fluctuate in its wavelength by 0.2 nm without losing the individual line.

Using a laser with a linewidth in the 0.1-2 nanometer range enables the use of the combined absorption of many spectral lines simultaneously in a given spectral region for gas concentration measurements. This range of linewidths is an example, and is not limiting. Lasers with linewidths from 0.1 to 5 nanometers or narrower or wider may also be used. Due to using a laser with a linewidth wider than a single absorption line, as opposed to conventional DIAL approaches, multiple absorption lines in a region of closely spaced absorption features may be used as the "on" or "on-line" wavelength. The relative difference between the absorption at the "on-line" wavelength and the "off-line" wavelength is not as great as when single transmission lines are used. However, this approach allows for the use of lasers having higher average power than lasers used in conventional DIAL approaches, making the absolute difference between absorption at the "on-line" wavelength and absorption at the "off-line" wavelength larger and compensating, at least partially, for the lower relative difference in absorption.

The linewidth of the laser used may depend upon the gas or gasses to be detected as well as specific clusters of absorption features of the gas. Lasers with linewidths from 0.1 to 5 nanometers or narrower or wider may be used. This larger flexibility in the desired linewidth opens the possibility for less complex and easier to operate laser sources that do not require amplification. Laser sources can be used having greater average power than laser sources used in conventional DIAL, TDLAS, and WMS systems. Thus, while absorption from a cluster of absorption lines is lower than from a single absorption line, an acceptable signal/noise ratio may be achieved due to the greater average power of the laser source.

Utilizing a laser having a linewidth of 0.1 to 2 or even 5 nanometers offers the technical improvement of allowing for simpler, more robust lasers to be used as compared to conventional systems. This improvement offers a distinct advantage in UAV, tower, ground, or aerial-platform based systems, where temperature changes and vibration may introduce errors into absorption measurements. Simpler, more robust lasers, the use of which is enabled by the present disclosure, are less affected by the heat and vibration of UAV, tower, ground, or aerial-platform based systems than more complex, less robust lasers. An example for such a laser source that can provide an appropriate spectral output may be a Fabry-Perot diode laser with optical external feedback that is wavelength selective. Other laser sources may also be used for this application.

The specific wavelengths and linewidths shown in FIGS. 4-7 are provided as examples and are not limiting. Different wavelengths corresponding to different features in spectra of different gasses may be used. Similarly, different linewidths corresponding to the widths of features in the spectra of the different gasses, or corresponding to different laser architectures, may be used.

Figure 8:
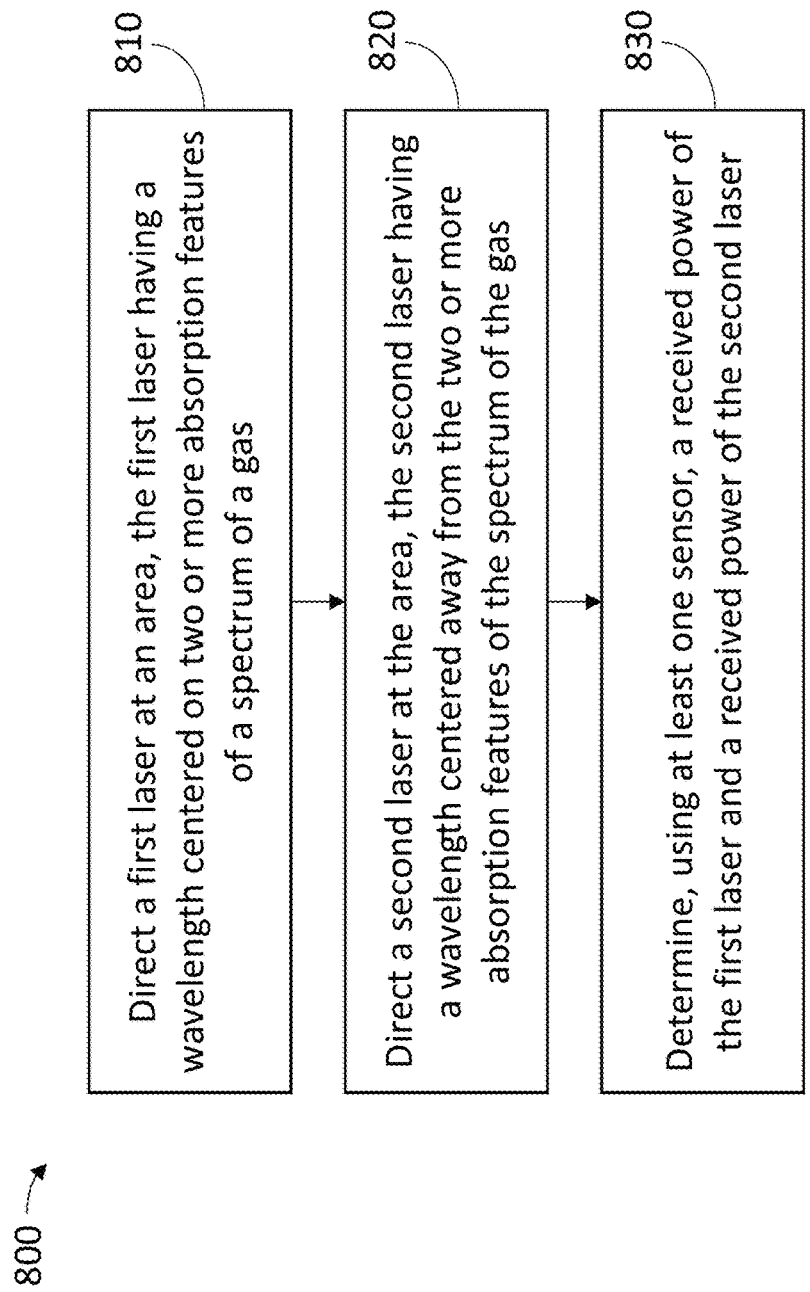
FIG. 8 is a flowchart illustrating operations of a method for open path gas detection and quantification.

FIG. 8 is a flowchart illustrating operations of a method 800 for detecting a gas. The method 800 may be performed by the system 100 of FIG. 1. The method 800 may include more, fewer, or different operations than shown. The operations may be performed in the order shown, in a different order, or concurrently.

At 810, a first laser is directed at an area, the first laser having a wavelength centered on closely spaced absorption features of a spectrum of a gas. The first laser may have a linewidth that overlaps two or more absorption features of the gas. The first laser may have a linewidth greater than or equal to 0.1 nm. The first laser may have a linewidth of 0.1-5 nm. The first laser may have a linewidth covering a portion of or the entirety of the closely spaced absorption features. The first laser may have a linewidth corresponding to a width of two or more features of the closely spaced absorption features. The first laser may be centered on a portion of the closely spaced absorption features. At 820, a second laser is directed at the area, the second laser having a wavelength centered away from the closely spaced absorption features of the spectrum of the gas. The second laser may be centered on a portion of the spectrum of the gas having approximately zero absorption and/or approximately full transmission.

At 830, at least one sensor determines a received power of the first laser and a received power of the second laser. In some examples, the at least one sensor includes a sensor for detecting the received power of the first laser and the received power of the second laser. In some examples, the at least one sensor includes a first sensor for detecting the received power of the first laser and a second sensor for detecting the received power of the second laser.

The method 800 may include transmitting, by a communications interface, a transmitted power of the first laser, a transmitted power of the second laser, the received power of the first laser, and the received power of the second laser to a computing device. The method 800 may include determining, by the computing device, a first difference between the received power of the first laser and the transmitted power of the first laser and a second difference between the received power of the second laser and the transmitted power of the second laser. The method 800 may include determining, by the computing device, an amount of the gas in the area based on the first difference and the second difference.

In some implementations, the method 800 does not include operation 820. The method may include transmitting, by a communications interface, a transmitted power of the first laser and the received power of the first laser to a computing device. The method 800 may include determining, by the computing device, a difference between the received power of the first laser and the transmitted power of the first laser. The method 800 may include determining, by the computing device, an amount of the gas in the area based on the first difference and additional data.

The method 800 may be performed by the system 200 of FIG. 2, with the exception that a single laser having a wavelength modulated between two frequencies is used instead of two lasers having the two frequencies.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system for detecting and quantifying a gas, the system comprising:
    a first laser having a wavelength overlapping with two or more absorption features in a spectrum of the gas;
    a second laser having a wavelength centered away from the two or more absorption features in the spectrum of the gas;
    at least one sensor to determine a received power of the first laser;
    a communications interface to transmit the received power of the first laser to a computing device; and
    the computing device to execute instructions to:
        determine a first difference between a transmitted power of the first laser and the received power of the first laser; and
        determine an amount of the gas based on the first difference and additional data including a second difference between a transmitted power of the second laser and a received power of the second laser.

2. The system of claim 1, wherein the additional data comprises atmospheric data.

3. The system of claim 1, wherein the additional data comprises data from the system collected at a different time.

4. The system of claim 1, wherein the additional data comprises measured absorption using a known reference.

5. The system of claim 1, further comprising a third laser having a wavelength centered away from the two or more absorption features in the spectrum of the gas,
    wherein the additional data further comprises a third difference between a transmitted power of the third laser and a received power of the third laser.

6. The system of claim 1, wherein the first laser has a linewidth greater than or equal to a distance between the two or more absorption features in the spectrum of the gas.

7. The system of claim 1, wherein the first laser has a linewidth greater than or equal to 0.2 nm.

8. The system of claim 1, wherein the first laser is not actively wavelength stabilized.

9. A system for detecting and quantifying a gas, the system comprising:
    a laser having a wavelength overlapping with two or more absorption features in an absorption spectrum of a gas;
    a controller to modulate the wavelength of the laser between the two or more absorption features and an adjacent region of the absorption spectrum of the gas having lower absorption;
    at least one sensor to determine a first received power of the laser when centered on the two or more absorption features and a second received power of the laser when centered on the adjacent region;
    a communications interface to transmit the first received power of the laser and the second received power of the laser to a computing device; and
    the computing device to execute instructions to:
        determine a first difference between the first received power and a first transmitted power of the laser when centered on the two or more absorption features and a second difference between the second received power and a second transmitted power of the laser when centered on the adjacent region; and
        determine an amount of the gas based on the first difference and the second difference.

10. The system of claim 9, wherein the laser has a linewidth greater than or equal to a distance between the two or more absorption features in the spectrum of the gas.

11. The system of claim 9, wherein the laser has a linewidth greater than or equal to 0.2 nm.

12. The system of claim 9, wherein the laser is not actively wavelength stabilized.

13. A method for detecting and quantifying a gas, the method comprising:
- directing a first laser at an area, the first laser having a wavelength overlapping with two or more absorption features in a spectrum of the gas;
- directing a second laser at a second area, the second laser having a wavelength centered away from the two or more absorption features in the spectrum of the gas;
- determining, using at least one sensor, a received power of the first laser;
- transmitting the received power of the first laser to a computing device;
- determining, using the computing device, a first difference between a transmitted power of the first laser and the received power of the first laser; and
- determining, using the computing device, an amount of the gas based on the first difference and additional data including a second difference between a transmitted power of the second laser and a received power of the second laser.

14. The method of claim 13, wherein the additional data comprises atmospheric data.

15. The method of claim 13, wherein the additional data comprises data from the system collected at a different time.

16. The method of claim 13, wherein the additional data comprises measured absorption using a known reference.

* * * * *